(12) United States Patent
Heil et al.

(10) Patent No.: US 8,108,617 B2
(45) Date of Patent: Jan. 31, 2012

(54) METHOD TO BYPASS CACHE LEVELS IN A CACHE COHERENT SYSTEM

(75) Inventors: Timothy H. Heil, Rochester, MN (US); James A. Rose, Rochester, MN (US); Andrew H. Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 12/028,196

(22) Filed: Feb. 8, 2008

(65) Prior Publication Data
US 2009/0204769 A1   Aug. 13, 2009

(51) Int. Cl.
*G06F 12/12* (2006.01)

(52) U.S. Cl. ............... 711/139; 711/E12.069; 711/137

(58) Field of Classification Search .................. None
See application file for complete search history.

(56) References Cited

U.S. PATENT DOCUMENTS

| | | | | |
|---|---|---|---|---|
| 5,247,639 A | * | 9/1993 | Yamahata | 711/138 |
| 7,103,748 B2 | * | 9/2006 | Day et al. | 711/207 |

* cited by examiner

*Primary Examiner* — Reginald Bragdon
*Assistant Examiner* — Eric Loonan
(74) *Attorney, Agent, or Firm* — Patterson & Sheridan LLP; James R. Nock

(57) ABSTRACT

Embodiments of the invention provide methods and apparatus for selectively bypassing cache levels when processing non-reusable transient data in a cache coherent system. To selectively bypass cache levels a page table entry (PTE) mechanism may be employed. To limit the number of PTE bits, the PTE may have a 2-bit "bypass type" field among other attribute bits that index which bits of a Special Purpose Register (SPR) identify the cache levels to be bypassed.

11 Claims, 5 Drawing Sheets

PAGE TABLE  200

| VIRTUAL PAGE ADDRESS (202) | PHYSICAL PAGE ADDRESS (204) | ATTRIBUTE BITS (206) | | STATUS BITS (208) | |
|---|---|---|---|---|---|
| VPA $_1$ | PPA $_1$ | AB $_1$ | BYPASS TYPE | SB $_1$ | } 210 |
| ⋮ | ⋮ | ⋮ | | ⋮ | |
| VPA $_N$ | PPA $_N$ | AB $_N$ | | SB $_N$ | |

| BYPASS TYPE BITS | |
|---|---|
| 00 | NO CACHE BYPASSED |
| 01 | USE DSCR [32:39] TO DETERMINE WHICH LEVELS OF CACHE TO BYPASS |
| 10 | USE DSCR [40:47] TO DETERMINE WHICH LEVELS OF CACHE TO BYPASS |
| 11 | USE DSCR [48:55] TO DETERMINE WHICH LEVELS OF CACHE TO BYPASS |

METHOD TO BYPASS CACHE LEVELS IN A CACHE COHERENT SYSTEM

BACKGROUND OF THE INVENTION

1. Field of the Invention

Embodiments of the invention generally relate to processors.

2. Description of the Related Art

In many computer systems blocks of memory or pages may be allocated to programs or processes executing on the computer system. Pages may be allocated in order to separate the memory space used by the various processes executing on the computer system. This separation ensures that one process does not overwrite data being used by or associated with another process. The address space assigned to a process may be a range of virtual memory addresses for pages of data which are mapped to physical locations of the data located within the main memory or disk memory of a computer system.

In order to locate page data within the computer system, the processor may use page tables to translate virtual memory addresses into physical memory addresses. Page tables may contain a plurality of entries which map virtual memory addresses to the physical memory addresses where the page data is located in memory (e.g., main memory or disk memory).

In addition to a virtual page address and a corresponding real page address, each page table entry or row may also contain status bits. The status bits may indicate the status of the page data located at the physical memory address. For example, one status bit may indicate if the page data corresponding to a virtual memory address is located in main memory or is located in disk memory.

Each page table entry may also include attribute bits. The attribute bits may indicate specific attributes associated with the page data for an entry. Specifically, the attribute bits may indicate which level of cache may be bypassed when processing the data.

DETAILED DESCRIPTION OF THE PREFERRED EMBODIMENTS

Figure 1:
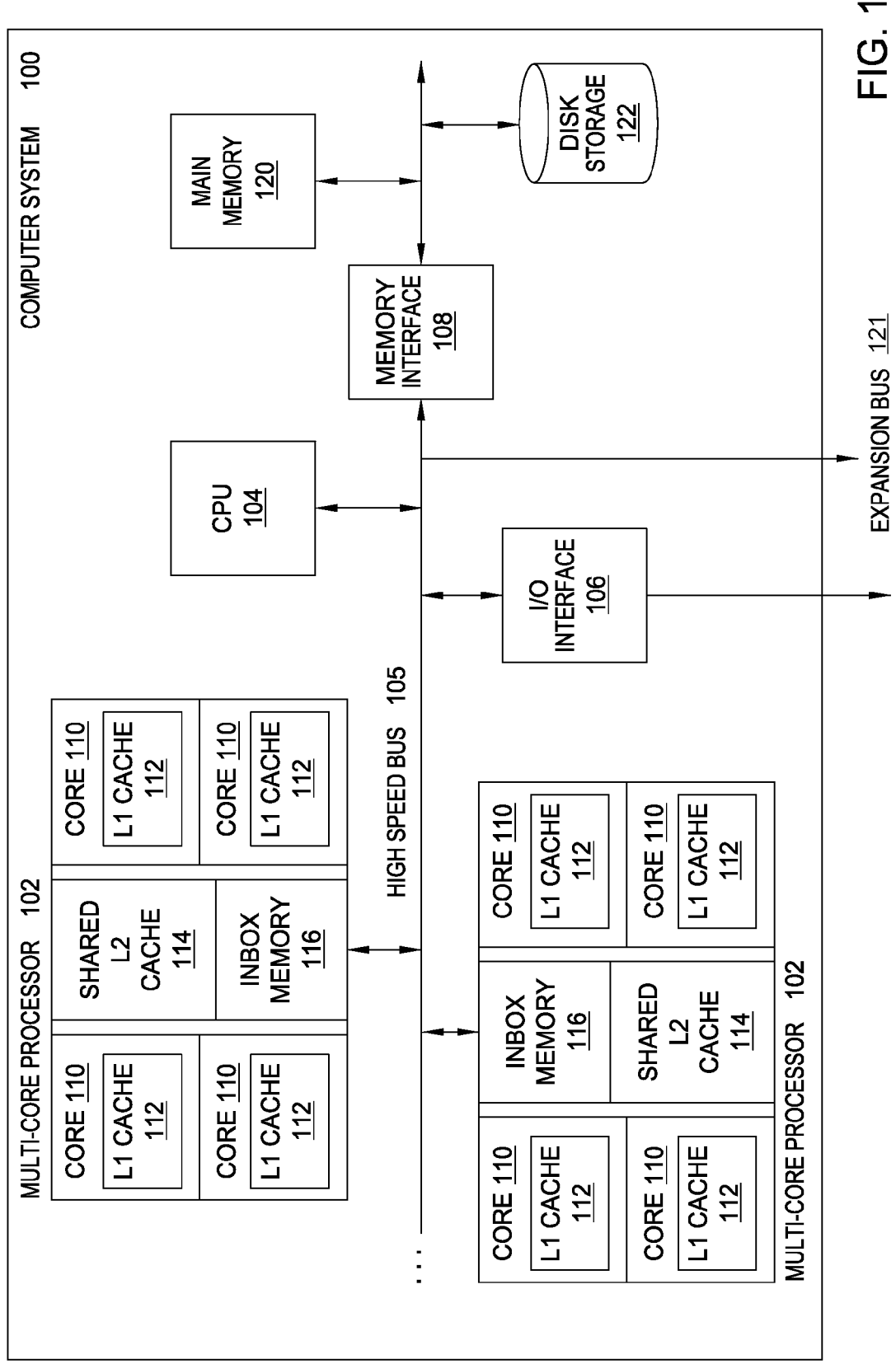
FIG. 1 illustrates a multiple core processing element, according to one embodiment of the invention.

Embodiments of the invention provide methods and apparatus for improving system performance by selectively bypassing cache levels when processing non-reusable transient data in a cache coherent system. An example in which non-reusable transient data may be processed is a streaming application. To selectively bypass cache levels a page table entry (PTE) mechanism may be employed. To limit the number of PTE bits, the PTE may have a 2-bit "bypass type" field among other attribute bits that index which bits of a Special Purpose Register (SPR) identify the cache levels to be bypassed.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module). Furthermore, while described below with respect to a processor having multiple processor cores and multiple L1 caches, embodiments of the invention may be utilized with any processor which utilizes a cache, including processors which have a single processing core. In general, embodiments of the invention may be utilized with any processor and are not limited to any specific configuration.

An Exemplary Computer System

FIG. 1 is a block diagram depicting a computer system 100 according to one embodiment of the invention. The system 100 may contain one or more multi-core processors 102. Each multi-core unit 102 may include multiple cores 110 each arranged around a shared level two cache (L2 cache) 114. The shared L2 cache 114 may include a portion of memory, referred to herein as inbox memory 116, which, as described below, may be used to manage memory access for threads being executed by the cores 110 in a multi-core unit 102. Each core 110 may also include a level one cache (L1 cache) 112 which, in some cases, may be used exclusively by that core 110.

In some cases, the system 100 may also include a further central processing unit (CPU) 104 which may provide additional processing functionality. The system 100 may also include an input/output (I/O) interface 106 and a memory interface 108 which may be used to communicate with external I/O device and additional system memory, respectively. Each of the components within the system may communicate across a high speed processor bus 105. The system 100 may also include an expansion bus 121, which may be used to connect the multi-core processor to additional system components. While depicted as separate components of a computer system 100, in some cases, two or more of the items depicted in FIG. 1 may be combined as part of a system on a chip (SOC).

The memory interface 108 may be coupled and, therefore, provide access to a main memory 120 and secondary storage or disk memory 122. The main memory and disk memory may be any type of main memory or disk memory known to those skilled in the art. For example, main memory may be a DRAM (Dynamic Random Access Memory) chip or a plurality of DRAM chips. The disk memory may be, for example, a magnetic disk drive or optical disk drive.

Each processor core 110 in the computer system 100 may contain a plurality of processing threads and a core cache (e.g., an L1 cache). The processing threads located within each processor core 110 may have access to the shared L2 cache 114.

The processor cores 110 may also have access to a plurality of inboxes within the inbox memory 116. The inboxes may be memory mapped address space. The inboxes may be mapped to the processing threads located within each of the processor cores 110. Each thread located within the processor cores 110 may have a memory mapped inbox and access to all of the other memory mapped inboxes. The inboxes may make up a low latency and high bandwidth communications network used by the processor cores 110.

The processor cores 110 may use the inboxes as a network to communicate with each other and redistribute data processing work amongst the processor cores 110. For some embodiments, separate outboxes may be used in the communications network, for example, to receive the results of processing by processor cores 110. For other embodiments, inboxes may also serve as outboxes, for example, with one processor core 110 writing the results of a processing function directly to the inbox of another processor core 110 that will use the results.

Page Table Entries

When implementing a program on a computer system data is transferred between the physical world and the computer's memory. As discussed above, a computer system may have many levels of memory, for example disk storage 122, main memory 120, L2 cache, and L1 cache. Consequently, managing which memories are storing which bits of data may be complicated, especially when multiple processes are running on the same machine at the same time.

To simplify matters, modern computer systems use one program, the operating system, to keep track of the physical location of each piece of data and to move data between physical locations. For each "user-level" program, the operating system fabricates a single, simplified virtual memory space. Processes running inside virtual memory do not have to move data between physical devices, and do not have to allocate and reallocate portions of the fixed amount of primary memory between them. They are free to use as much of their virtual memory as necessary without reference to other processes.

Associating data in a virtual memory to the corresponding location in physical memory is done by utilizing a page table.

A page table is the data structure used by a virtual memory system in a computer operating system to store the mapping between virtual addresses and physical addresses. Virtual addresses are those unique to the accessing process, while physical addresses are those unique to the CPU (i.e., RAM).

In a single processor system (such as a simple personal computer) there is only one processor doing all the work, and therefore only one processor that can read or write the data values. Moreover a simple single processor can only do one thing at a time, so when a value in storage is changed, all subsequent read operations will see the updated value.

In multiprocessor systems (or systems with multi-core processors), however, there are two or more processors working at the same time, so there is the possibility that the processors will all want to process the same value at the same time. Provided none of the processors updates the value then they can share it indefinitely, but as soon as one updates the value, the others will be working on an out-of-date copy. Cache coherency refers to the integrity of data stored in local caches of a shared resource and is intended to manage such conflicts and maintain consistency between different levels of cache. An example of an architecture which requires a certain level of cache coherency is a PowerPC architecture.

Despite the benefits of cache coherency in a multi-processor environment, there are some applications in which a performance advantage may be realized by bypassing certain caches. For example, streaming applications may see a performance advantage because streaming applications often have transient data that will not be reused later, and current data in the cache may be accessed later.

Embodiments of the present invention may utilize page table entries (PTE) to specify which levels of cache to bypass. In some embodiments, one or more attribute bits of a page table entry may be used to specify which levels of cache to bypass. Other embodiments may use one or more attribute bits of a PTE as an index referencing a register.

FIG. 2 illustrates an exemplary page table 200. As illustrated in FIG. 2, the first column 202 of the page table 200 contains a plurality of virtual page addresses ($VPA_{1-N}$). Each virtual page address may correspond to a page of memory assigned by an operating system to be used by processes running on the computer system.

The second column 204 of the page table 200 contains a plurality of physical page addresses ($PPA_{1-N}$). Each physical page address may correspond to a virtual page address in the first column of the page table 200. A physical page address may indicate the address of a physical page or block of data within the memory (e.g., main memory or disk memory) of the computer system 100.

Each pair of corresponding physical page and virtual page addresses form a page table entry (PTE) 210. In addition to a virtual page address and a corresponding real page address, each PTE 210 may also contain status bits 208. The status bits may indicate the status of the page data located at the physical memory address.

Each PTE 210 may also include attribute bits. The attribute bits may indicate specific attributes associated with the page data for the entry. Specifically, the attribute bits may include bypass type control bits that indicate which levels of cache may be bypassed when processing the data. However, as described above, current page tables only specify a limited number of page attributes via the attribute bits.

Bypass Cache Control

Embodiments of the invention may increase the number of page attributes which may be specified without increasing or minimizing the increase in the size of the page table. According to one embodiment of the invention, a set of attribute bits, referred to herein as bypass type control bits, and a special purpose register may be used to specify which levels of cache may be bypassed or which policies to apply in bypassing cache levels, while maintaining the size or minimizing an increase in the size of the page table. The bypass type control bits may be used to "point" to a set of bits within a special purpose register that specify what levels, if any, of cache should be bypassed when accessing the data associated with the PTE.

Figures 2A, 2B:
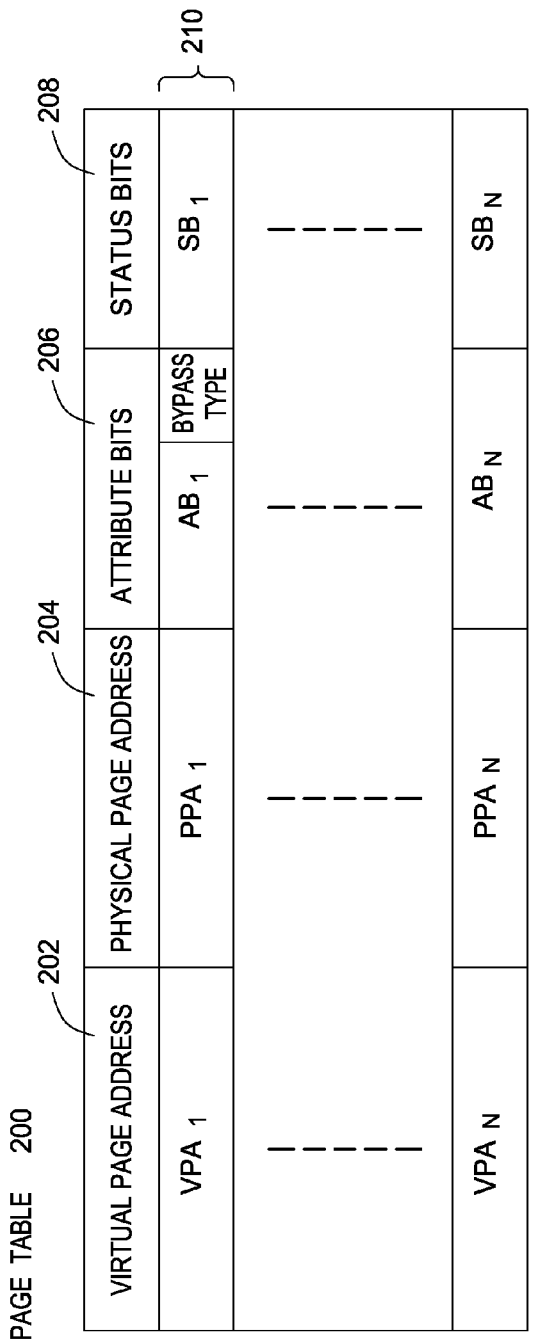
FIG. 2A is an exemplary page table, according to embodiments of the invention.
FIG. 2B illustrates possible associations between Bypass Type Bits and a corresponding Data Stream Control Register, according to embodiments of the invention.

FIG. 2B illustrates different combinations or values of the bypass type control bits which may relate to different sets of bits within a special purpose register. The various sets of bits within the special purpose register may be used to indicate which levels of cache may be bypassed or which policies to apply in bypassing cache levels. For example, a bypass type control bit combination of 0b01 may instruct a processing core to look at bits 32 through 39 of a specific special purpose register, such as the Data Stream Control Register (DSCR). In contrast, a bypass type control bit combination of 0b10 may instruct a processing core to look at bits 40 through 47 of the DSCR.

Figure 3:
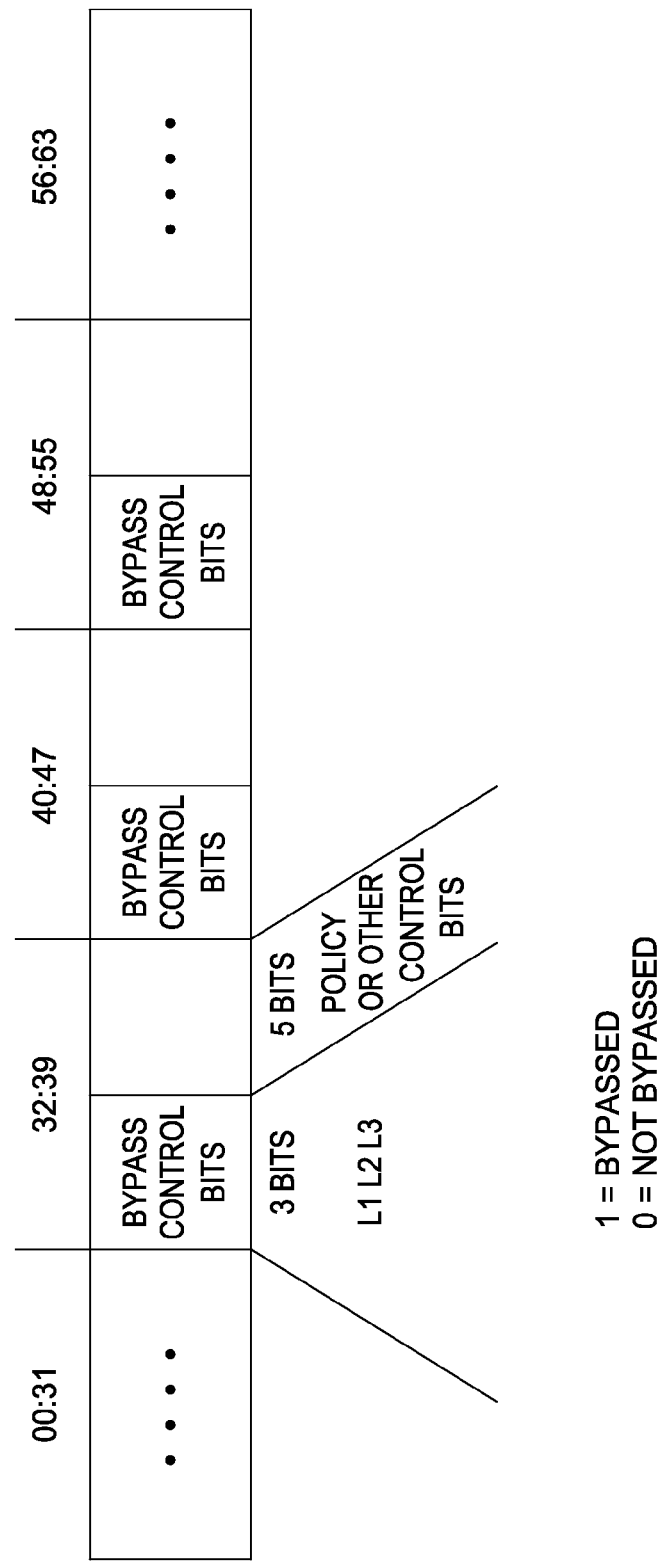
FIG. 3 is an exemplary entry in a Data Stream Control Register.

FIG. 3 exemplifies a Data Stream Control Register (DSCR) which may contain bypass control bits that instruct a processing core as to which levels of cache may be bypassed or which policies to apply in bypassing cache levels. If, for example, the bypass type control bits were 0b01, DSCR bits 32 through 39 would be used. Where three levels of cache are employed, three of the 8 bits may be used to specify cache levels to bypass, where a bit value of '1' would indicate that level of cache is to be bypassed and a bit value of '0' would indicate that level of cache is not to be bypassed.

Depending on the embodiment, the remaining 5 bits may be ignored or may be used to specify certain policies to apply in bypassing cache levels. An example policy that may be applied in bypassing cache levels may be whenever a specific process requests data it may always bypass a certain cache level (e.g., L2 cache or L1).

In the present example, 3 bytes of the DSCR (e.g., DSCR [32:39], DSCR [40:47], and DSCR [48:55]) may be used for cache bypass control bits. This may be used to provide flexibility among several different types of applications, without significant coding changes. For example, one application may have 64 bits of data temporarily stored in the DSCR with bits 32 through 39 set aside to specify which levels of cache to bypass. A second application may also have 64 bits of data temporarily stored in the DSCR, but bits 32 through 39 may be assigned some other purpose. Consequently, using DSCR bits [32:39] may work fine for the first application but not for the second application. To allow both applications to work with a minimal change to hardware and/or software, embodiments of the present invention may allow a programmer to change two attribute bits (e.g., bypass type control bits from 0b01 to 0b10), instead of rewriting more significant portions of code.

Figure 4A:
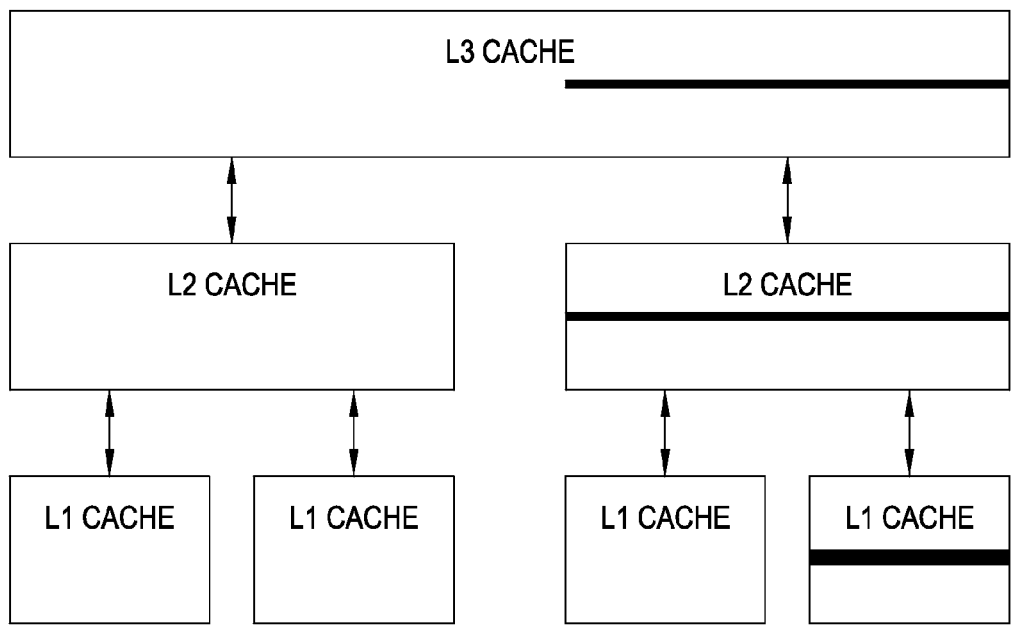
FIGS. 4A-4C illustrate the bypass of cache levels in a cache coherent system.
Figure 4B:
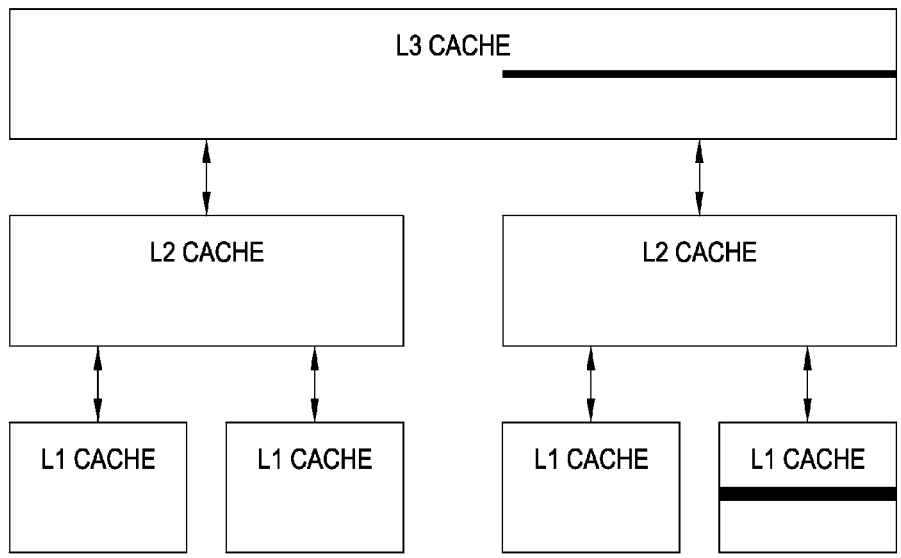
Figure 4C:
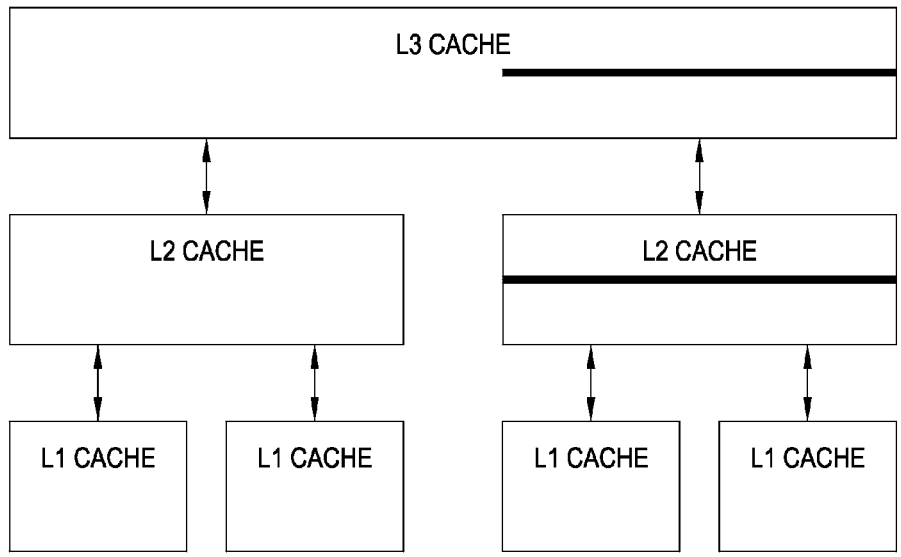

FIGS. 4A-4C illustrate different types of cache bypass for different bit combinations, in accordance with the present invention. The examples assume a single cache line 410 is being accessed from the L3 cache. In accordance with an exemplary embodiment, the single cache line 410 may be prefetched.

FIG. 4A illustrates a bypass type control bit combination of 0b00 which corresponds to no DSCR bit segment and results in cache coherency between all three levels of cache. The cache coherency is depicted by copies of the cache line 410 being present in all three levels of cache. Of course, the same result may be achieved by specifying a non-zero bypass type control bit combination and having zero bits in the corresponding DSCR register.

FIG. 4B depicts a bypass type control bit combination of 0b01 which indicates the cache control bits can be found in DSCR bits [32:39]. As illustrated, in this example, DSCR [32:39]=010XXXXX which results in the L2 cache being bypassed. Thus, a copy of the cache line 410 is in the L1 and L3 caches, but not the L2 cache.

FIG. 4C depicts an alternative where the bypass type control bit combination is 0b01, again corresponding to DSCR bits [32:39]. However, as illustrated in FIG. 4C, DSCR [32:39]=100XXXXX which results in the L1 cache being bypassed. Thus, a copy of the cache line 410 is in the L2 and L3 caches, but not the L1 cache.

Conclusion

System performance may be improved by selectively bypassing cache levels, for example, when processing non-reusable transient data in a cache coherent system. Such processing may occur when processing graphics data in streaming applications. To selectively bypass cache levels a page table entry (PTE) mechanism may be employed. Some degree of flexibility may be achieved by utilizing a limited number of PTE bits as an index to point to a set of bits of a Special Purpose Register (SPR) to identify the cache levels to be bypassed.

What is claimed is:

1. A method comprising:
   retrieving a bypass type field from a page table entry for a cache line to be accessed;
   accessing a set of one or more bypass control bits in a control register using bits in the bypass type field, the set of one or more bypass control bits specifying none or more cache levels to bypass; and
   bypassing none or more cache levels as specified by the set of one or more bypass control bits when accessing the cache line.

2. The method of claim 1, wherein the control register is a privileged special purpose register (SPR).

3. The method of claim 1, wherein the set of one or more bypass control bits specify whether none or more of at least three cache levels are to be bypassed when accessing the cache line.

4. The method of claim 1, wherein the set of one or more bypass control bits specify one or more cache levels to bypass when prefetching the cache line.

5. The method of claim 1, wherein the set of one or more bypass control bits specify one or more cache levels to bypass when storing the cache line.

6. Cache access circuitry comprising:
   bypass control logic configured to retrieve a bypass type field from a page table entry for a cache line to be accessed and access a set of one or more bypass control bits in a control register using bits in the bypass type field, the set of one or more bypass control bits specifying none or more cache levels to bypass; and
   access control logic configured to bypass none or more cache levels as specified by the set of one or more bypass control bits when accessing the cache line.

7. The circuitry of claim 6, wherein the set of one or more bypass control bits specify whether none or more of at least three cache levels are to be bypassed when accessing the cache line.

8. The circuitry of claim 6, wherein the set of one or more bypass control bits specify one or more cache levels to bypass when storing the cache line.

9. A processor comprising:
   at least two cache levels;
   a page table including a page table entry for a cache line, wherein the page table entry includes a bypass type field;
   a control register including a set of one or more bypass control bits beginning at a bit location indicated by the bypass type field, wherein the set of one or more bypass control bits specifies none or more cache levels to bypass; and
   cache access circuitry configured to retrieve the bypass type field from the page table entry, access the set of one or more bypass control bits in the control register, and bypass none or more cache levels as specified by the set of one or more bypass control bits when accessing the cache line.

10. The processor of claim 9, wherein the processor comprises at least three cache levels, and wherein the set of one or more bypass control bits specify whether none or more of the at least three cache levels are to be bypassed when accessing the cache line.

11. The processor of claim 9, wherein the set of one or more bypass control bits specify one or more cache levels to bypass when staring the cache line.

* * * * *